United States Patent [19]

Guillou

[11] Patent Number: 4,864,110

[45] Date of Patent: Sep. 5, 1989

[54] ELECTRONIC PAYMENT PROCESS USING A SMART CARD

[75] Inventor: Claude L. Guillou, Bourgbarre, France

[73] Assignee: Etat Francis/Telediffusion De France, Paris, France

[21] Appl. No.: 214,729

[22] PCT Filed: Oct. 13, 1987

[86] PCT No.: PCT/FR87/00397

§ 371 Date: Jun. 1, 1988

§ 102(e) Date: Jun. 1, 1988

[87] PCT Pub. No.: WO88/02900

PCT Pub. Date: Apr. 21, 1988

[30] Foreign Application Priority Data

Oct. 16, 1986 [FR] France .................. 86 14378

[51] Int. Cl.$^4$ .................................. G06K 5/00
[52] U.S. Cl. .................................. 235/380; 235/379
[58] Field of Search .................. 235/379, 380

[56] References Cited

U.S. PATENT DOCUMENTS 4,810,862 3/1989 Nakano .................. 235/380

FOREIGN PATENT DOCUMENTS

904689 8/1986 Belgium .
0227532 7/1987 European Pat. Off. .
2403597 4/1979 France .
2503423 10/1982 France .
607799 10/1978 Switzerland .

Primary Examiner—Harold I. Pitts
Attorney, Agent, or Firm—Oblon, Spivak, McClelland, Maier & Neustadt

[57] ABSTRACT

The storage cells are grouped into elements grouping at least two cells, each element being locatable by an address and having a parity. The balance of the card is the number of non-zero even elements with an address below the address of the odd element with the lowest address and which is called the "terminal". In order to debit the card and reduce said balance, the terminal is moved towards a lower address, whilst creating a new old element of lower address than the terminal to be displaced. In order to credit the card and increase this balance, the terminal is moved towards a higher address, whilst again giving to possible odd elements with a higher address than the terminal to be displaced an even character and whilst creating a new odd element with a higher address than the terminal to be displaced.

5 Claims, 5 Drawing Sheets

ELECTRONIC PAYMENT PROCESS USING A SMART CARD

BACKGROUND OF THE INVENTION

The present invention relates to an electronic payment process using a smart card.

It is known that electronic means already exist for carrying out certain transactions, such as e.g. the payment for goods, the payment for telephone communications or various services. This is undergoing rapid development, because it offers considerable advantages as regards speed, ease and security. It is possible to refer in this connection to "electronic money".

These means use a smart card, which is a plastic support in which is embedded an electronic component containing a microprocessor, which contains a data memory of several hundred bits produced in Eprom technology. It consists of an Electrically Programmable Read-Only Memory.

The electronic processing performed in such a card consists of making a payment unit or token correspond with each bit of a memory zone. A point of sale terminal equipped with a card reader performs a transaction by lacing a certain number of bits in the memory. The lacing of a bit consists of electrically passing a bit in the memory which was in logic state 1 corresponding to the crediting of one unit to logic state 0 corresponding to zero credit. As this data memory is produced in Eprom technology, this change of state is electrically irreversible.

These smart or chip cards have been described as with respect to their operation and applications in an article by Michel Ugon and Louis Guillou entitled "les cartes àpuce" published in "La Recherche", no. 176, April 1986, vol. 17, pp. 472-479.

Although satisfactory in certain respects, these electronic payment processes suffer from disadvantages. Thus, on the one hand it is not possible to reload the card and on the other hand there is a high bit consumption, the number of laced bits being in fact equal to the number of tokens to be debited.

SUMMARY OF THE INVENTION

The object of the present invention is to obviate these disadvantages by proposing a process in which it is possible to reload the memory in order to recredit the same and in which it is sufficient to lace a single bit to debit any random number of units within the limits of the available credit. The possibility of reloading the card has led the inventor to call his system in picturesque manner an "electronic moneybox".

The process according to the invention is very simple. An Eprom comprises binary storage cells, whose content is equal to either 0 or 1. Each cell can be electrically laced by irreversibly passing its content from state 1 to state 0. The inventive process is characterized by the fact that the storage units are grouped into entities called "elements", each element being constituted by at least two storage cells. Each cell can be located in the memory by an address and has a parity: an element being called even when the number of its cells in state 1 is even and is called odd when the number of its cells in state 1 is odd.

According to the invention, the balance of the card is equal to the number of non-zero even elements, whose address is below the address of the odd element having the lowest address. The latter is called a "terminal". If said element does not exist (which is the case before the first debit), the number of non-zero even elements is equal to the total number of non-zero elements of the memory.

In order to debit the card and reduce the balance, the terminal is moved towards a lower address whilst creating another odd element with a lower address than the preceding address. This new odd element consequently becomes the new terminal. The number of debited units is equal to the number of non-zero even elements located between the old terminal and the new terminal, plus 1.

In order to credit the card and increase its balance, the terminal is moved towards a higher address, whilst giving again to any already odd elements with an address higher than the terminal to be displaced an even character. This is brought about by lacing another cell of these elements. A new odd element with a higher address is also produced. It can occur that the reloading is such that the new terminal corresponds to an element which is already odd, in which case said element is left as it is. The number of units credited in the card is equal to the number of non-zero even elements between the old terminal and the new terminal, plus 1.

The storage elements can be pairs of cells, or nibbles (four-bit bytes), or bytes, or more complex words. In the same memory it is possible to find elements of different structures (e.g. nibbles associated with bytes).

Preferably, the card is of the smart card microprocessor type already existing for the applications referred to hereinbefore. The memory of such cards comprises one or more reserved zones constituted by bytes and each associated with an authorization, the basic byte of address A and the following byte of address A+1 not being available for the payment, but the bytes of address A+2 and up to a maximum address Amax are usable.

BRIEF DESCRIPTION OF THE DRAWINGS

The invention is described in greater detail hereinafter relative to non-limitative embodiments and the attached drawings, wherein show.

DESCRIPTION OF THE PREFERRED EMBODIMENTS

In the following description, it is assumed in a purely explanatory manner that the elements used are nibbles, i.e. groups of four binary cells. No hypothesis is made concerning the structure of the circuit surrounding the memory, whereby these can be of the type found in existing smart cards, in which case said circuits are able to fulfill functions other than that of controlling or managing the memory (emission of codes, ciphering, deciphering, etc.). However, these circuits can also be of a simpler type and more specific to the "moneybox" application.

Figure 1:
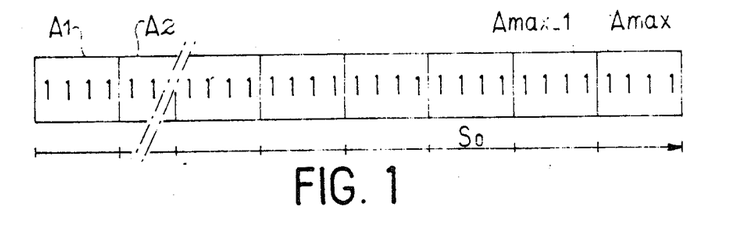
FIG. 1 diagrammatically the initial state of a memory only containing 1.

FIG. 1 diagrammatically shows the elements of a memory prior to use. All the binary cells are loaded to 1. Therefore all the nibbles are even, because they all contain four ones. The initial balance So corresponds to the number of such elements, which are located by an address ranging from A1 for the first to Amax for the last. Nibble Amax constitutes to a certain extent the "bottom" of the moneybox. It can be considered that the first odd element is a fictional nibble, which would be at the frictional address Amax+1.

Figure 2:
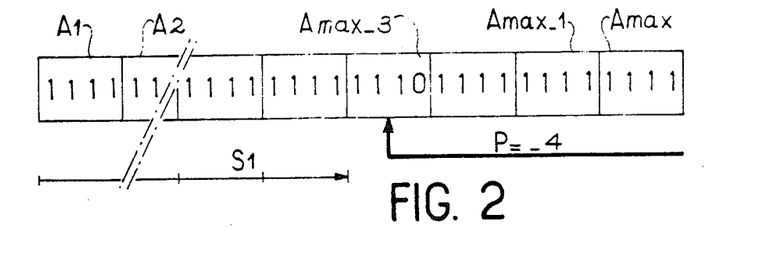
FIG. 2 a first payment operation.

FIG. 2 diagrammatically shows a first four unit payment operation P. The fourth nibble before the last (the latter included), i.e. that having the address Amax-3 is brought into the odd state by lacing one of its bits, i.e. that having the least significance. The nibble of address Amax-3 then constitutes a terminal and the new balance S1 is equal to So-4. This is the number of even elements with an address below the odd element with the lowest address.

Figure 3:
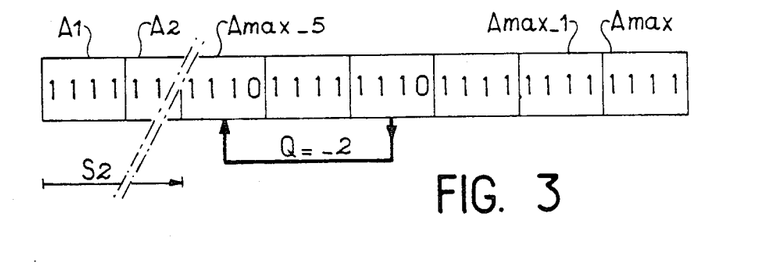
FIG. 3 a second payment operation.

FIG. 3 diagrammatically shows a second two unit payment operation Q. The terminal is displaced by two orders or ranks whilst giving the nibble of address Amax-5 an odd character. It is now this nibble which is the odd element with the lowest address. Naturally, the nibble of address Amax-3 is not modified and remains odd. Following this second operation, the new balance is S2=S1−2. Thus, the payment operations can follow one another in accordance with the same principle, the terminal backspacing towards ever lower addresses.

Figure 4:
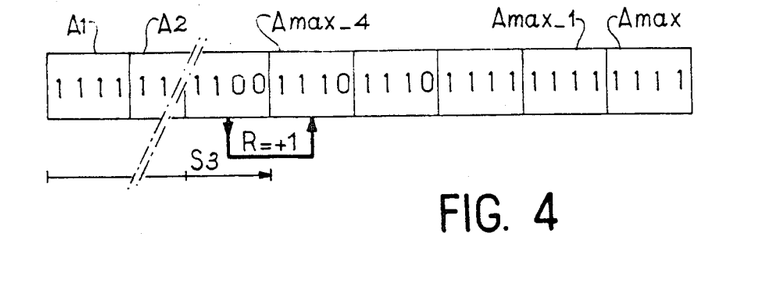
FIG. 4 a first reloading operation.

Conversely, for reloading the card, the terminal is moved towards a high address. FIG. 4 thus represents a reloading R of one unit. The address nibble Amax-5 is restored to the even state by lacing a second bit, which is equivalent to erasing the terminal and the nibble of address Amax-4 is brought into the odd state. The latter is then the new odd nibble with the lowest address and therefore it constitutes the new terminal. The balance passes from S2 to S3=S2+1.

Figure 5:
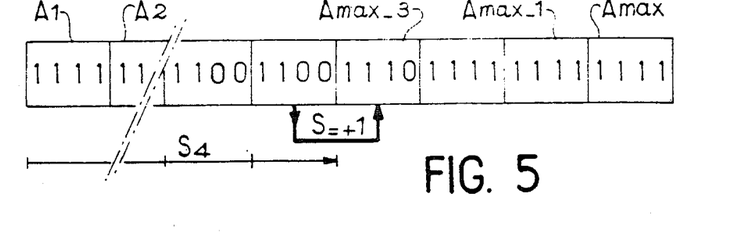
FIG. 5 a second reloading operation.

FIG. 5 shows a new case S of reloading by one unit. The nibble of address Amax-4 is brought into the even state by lacing a second bit, but the nibble of address Amax-3 is left intact, because it is already in the odd state due to the first payement operation. The balance passes from S3 to S4=S3+1.

Figure 6:
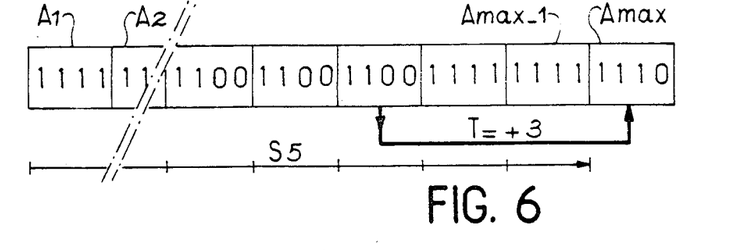
FIG. 6 a third reloading operation.

FIG. 6 shows another case T of reloading by 3 units, which reloads the card to S5=S4+3.

Figure 7:
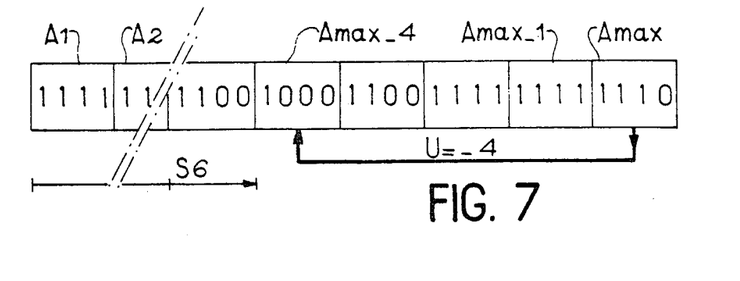
FIG. 7 a third payment operation.
Figure 8:
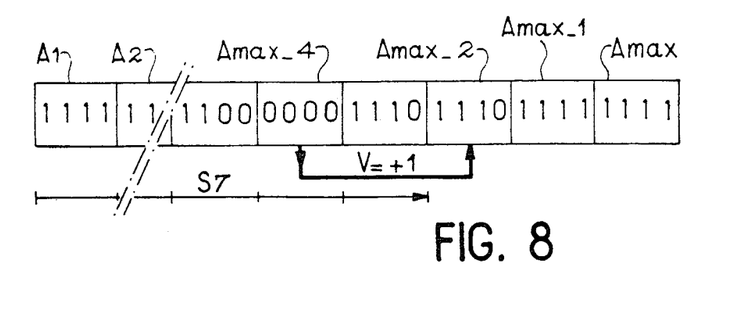
FIG. 8 a fourth reloading operation.

Payment operations can again be considered. FIG. 7 shows a 4 unit payment U, so that the nibble of address Amax-4 is again given an odd character, so that said element now contains three 0's, because it is the third time that it serves as the terminal. If a reloading operation V is now carried out, it is necessary to restore said nibble to an even state by lacing its last bit. As this nibble now only contains 0's, it will not be subsequently taken into account. Therefore the new balance is S7=S6+1 (although the terminal has been displaced by two orders, because a zero element has appeared in the interval).

The procedure can continue for as long as there are non-zero nibbles. The maximum available balance is gradually reduced as a result of the appearance of elements, whose bits are all zero.

It is clear that a payment operation is not always possible. If the amount to be withdrawn exceeds the balance, payment is impossible. In the same way, a reloading operation is not always possible. If the amount to be reloaded exceeds the difference between the total number of elements of the memory and the balance prior to reloading, this will not be possible. At the best, it would be possible to place the terminal in a fictional nibble, which would be located just after the final nibble of address Amax. Thus, the reloading operation of FIG. 6 could at a maximum relate to 4 units. In this case there would no longer be an odd nibble in the memory and there would be a maximum balance So, which would be that of the initial state (FIG. 1). It is therefore possible to "block" reload the moneybox.

It is obvious that in practice, except in exceptional circumstances, the card reloading operations would not relate to such small sums as those referred to hereinbefore and which have only been chosen for the purpose of simplifying the explanations. In practice, the loadings would involve e.g. 50 or 100 units.

Moreover, in general, there would be a series of payments and then a single reloading, followed by a new series of payments. The succession of three reloadings R, S, T of FIGS. 4, 5 and 6 was only intended to illustrate the various cases which could be encountered in practice during reloading (already odd nibbles, 0's, etc.).

It is also obvious that the continuous band structure of the memory as shown in FIGS. 1 to 8 is only a diagrammatic representation. On using a chip or smart card of the type already in use of the access control key-holder type, it is possible to associate therewith a single authorization consumption zone, which is in fact organized in the manner shown in FIG. 9. It comprises up to 32 words, each formed by 4 bytes. For coherence reasons, these words start with the nibble 0110. The basic byte of address A contains a first nibble equal to 0110 and then a second nibble constituted by an opening indicator io and a closing indicator if. The following byte of address A+1 gives the maximum address Amax relative to the final byte of the memory.

Figure 9:
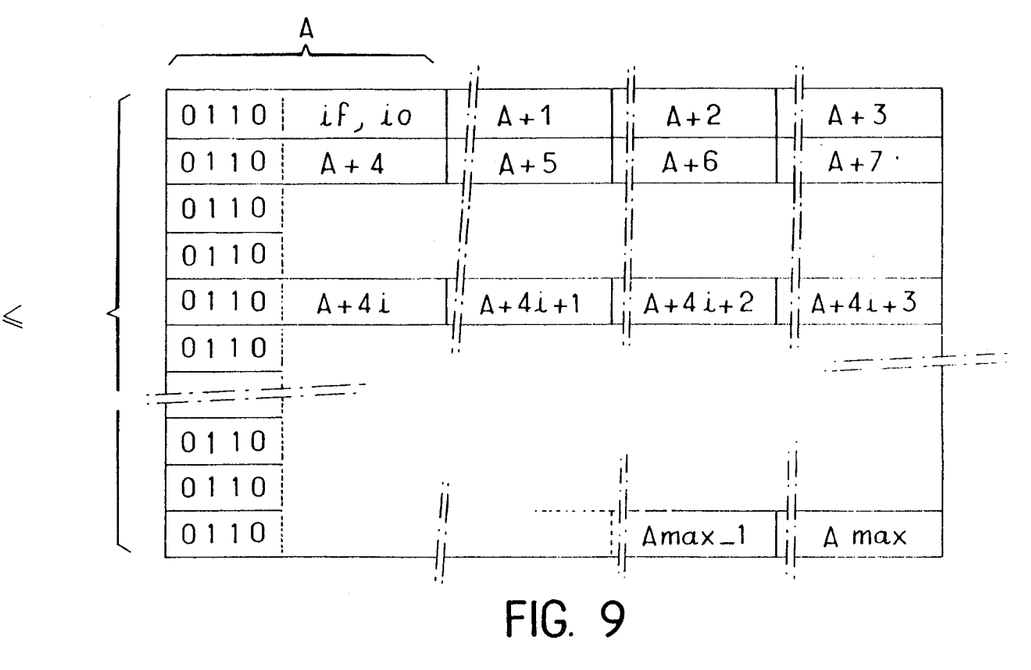
FIG. 9 diagrammatically the distribution of the different words of a memory such as are encountered in conventional smart cards of the access control keyholder type.

Thus, the first word only offers 2 available bytes, whilst the other words each offer 1 nibble and 3 bytes, i.e. 4 elements. Thus, in all there is a maximum of 2+31×(1+3)=126 elements, including 31 nibbles and (2+31×3)=95 bytes. The reserve zone thus comprises 31×4+95×8, i.e. 884 binary storage cells.

On using the conventional payment method by tokens, with such a memory there would be 884 units. Using the process of the invention, a much larger number of units would be available.

Thus, on starting there would be 126 units (the 126 elements). After a certain number N of payments (whereof the total number must not exceed 126 units), it is possible to block reload the memory by making even the N elements serving as terminals during the N payments. Thus, there are once again 126 units and it is possible to make M payments. A block reloading is still possible by making even the M elements which have been used as terminals. Certain of these elements could have been made even twice and would then contain four 0's and would not be subsequently taken into account. Naturally, a moment arises where all the elements are even, which definitively empties the moneybox without any reloading possibility.

With fixed resupplies of 50 units separated by on average 20 payments, the zone can be resupplied approximately 16 times and consequently carries approximately 800 units. Thus, in the case of on average 2.5 units per payment, the moneybox consumption has an efficiency comparable to the token consumption used in existing cards.

However, in the case of fixed resupplies of 100 units and average payments of 20 units, the invention process would permit transactions relating to approximately 7000 units, which makes the interest of the process readily apparent.

Figure 10:
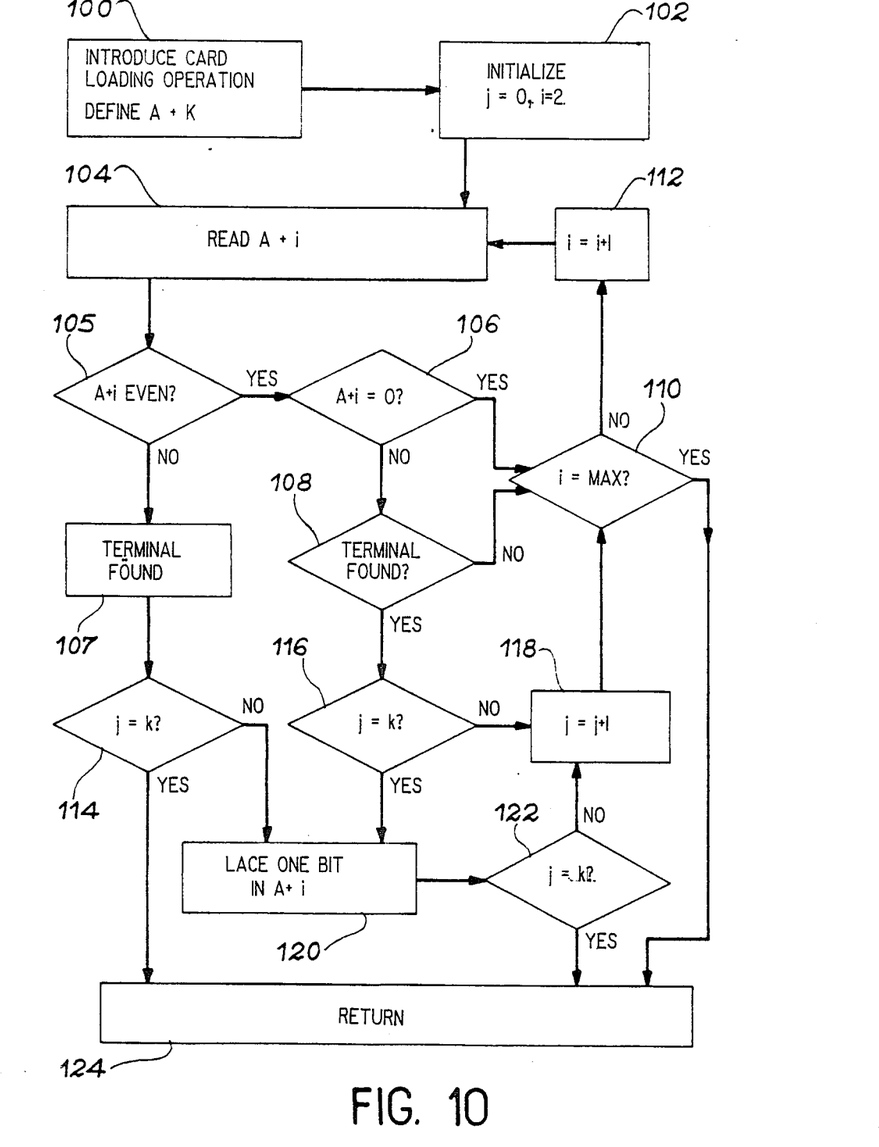
FIG. 10 a flowchart showing the various operations involved in the reloading phase.

FIG. 10 is a flowchart illustrating the operations performed during a reloading. In this flowchart, the meaning of the operations conventionally designated by rectangles or lozenges is as follows:

100: introduction to the card loading operation; definition of the basic address A and the number of units K to be loaded—the variable j giving at the end the number of units effectively charged;

102: reading the element of address A+1 giving the address Amax fixing the bottom of the reserved zone and the initialization from j to 0 and a running index i to 2, whilst a binary logic variable which can be called a "terminal" is created and can assume a value 0 signifying that the terminal is sought and a value 1 signifying that the terminal has been found;

104: reading the element of address A+i, i.e. A+2 at the outset;

105: is the element of address A+i even?

106: is the element of address A+i which is even, zero?

107: the terminal is found (the logic variable is set or left in state 1);

108: has the terminal been found?

110: is index i at its maximum, (i.e. is the address A+i equal to the maximum address Amax)?

112: increase i by one unit;

114: is j equal to K, in other words is the number j of counted units equal to the desired number K?

116: is j equal to K?

118: increase j by one unit;

120: lace one bit in the element of address A+i;

122: is j equal to K?

124: return to the main program, j units having been introduced on the K requested.

Figure 11:
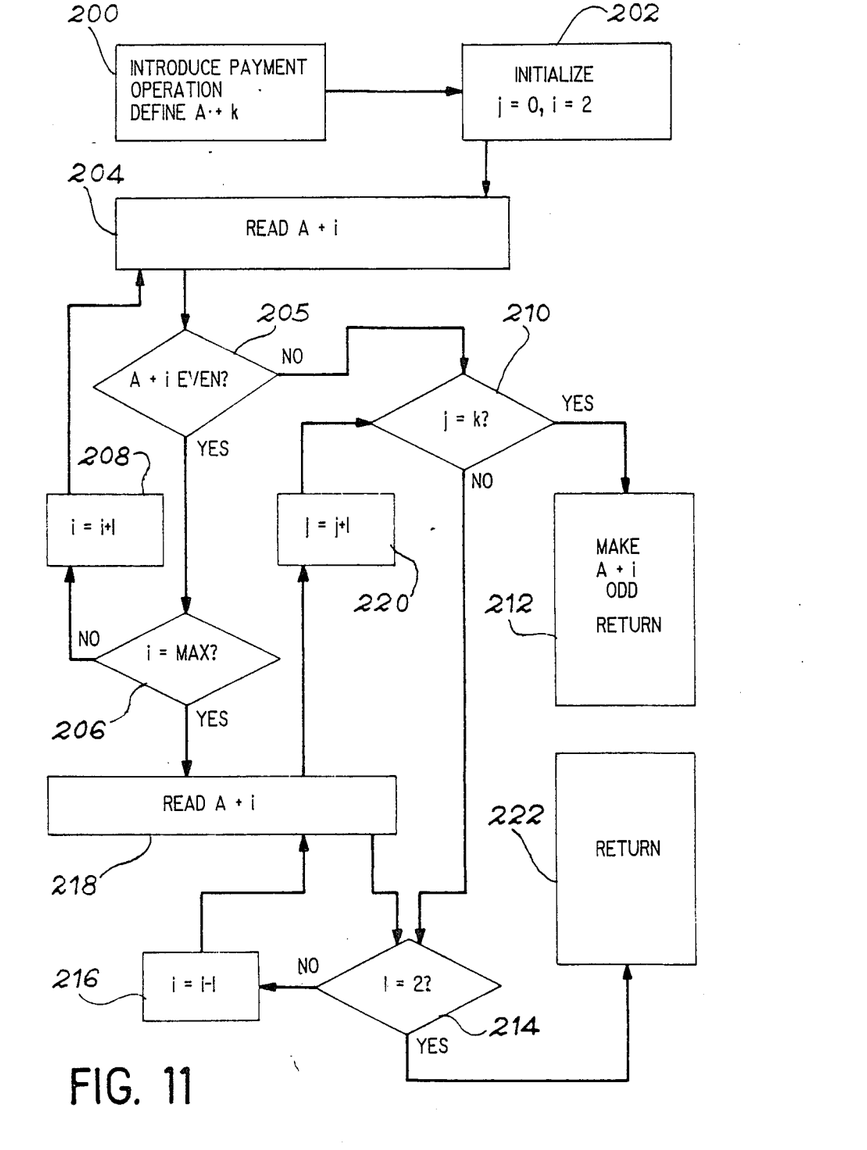
FIG. 11 a flowchart showing the various operations involved in the payment phase.

FIG. 11 in the same way shows a flowchart illustrating the operations performed during a payment and which have the following meanings:

200: introduction to the payment operation; definition of the basic address A of the number of units K to be debited—the variable will at the end indicate the balance j in the case where it is inadequate, i.e. below K;

202: reading the element of address A+1 giving the address Amax fixing the bottom of the reserved zone and initialization from j to 0 and a running index i to 2;

204: reading the element of address A+i;

205: is the read element even?

206: is i maximum?

208: increase i by one unit;

210: is j equal to K?

212: the element of address A+i is placed or left in the odd state and returned to the general program;

214: is i equal to 2?

216: decrease i by one unit;

218: read the element of address A+i;

220: increase j by one unit;

222: the balance is inadequate for debiting K units; return to the general program and in this case the variable j indicates the balance.

It is pointed out that it is purely by convention that it has been assumed that the memory initially contained 1's. The situation would have been the same in the case of 0's, the essential point being that the lacing operation irreversibly passes a cell with one binary state to the other binary state.

It is also obvious that it is possible to start by lacing any bit in an element to make the latter odd and that it is not necessary to firstly act on the least significant bit. This is yet another advantage of the process. In order to carry out a payment operation, it is possible to choose between at least two bits. Therefore in the case of difficulties in writing the memory, which sometimes occurs, a simple replacement solution exists.

Naturally, it would also be possible to reverse the parities and start with a memory having all odd elements. The terminal would then be the first even element. However, in practice it would appear to be more convenient to start with even elements and make them odd.

I claim:

1. Electronic payment process using an Eprom card incorporating binary storage cells with a logic content equal either to 0 or to 1, whereby each cell can be electrically laced by irreversibly passing its content from one state to another, said process being characterized in that:

the storage cells are grouped into elements grouping at least two cells, each element being locatable by an address and having a parity, one element being said to be even when the number of its cells in state 1 is even and is said to be odd when the number of its cells in state 1 is odd, the balance of the card is the number of non-zero elements having a first parity and an address below the address of the element of opposite parity with the lowest address and which is called a "terminal" or, if the latter element does not exist, the number of non-zero elements of said first parity in the memory, to debit the card and reduce said balance, the terminal is moved towards a lower address whilst creating a new opposite parity element with a lower address than the terminal to be displaced, whereby said new element becomes the new terminal, the number P of debited units being equal to the number of first parity elements located between the old terminal and the new terminal, plus 1, to credit the card and increase the balance, the terminal is moved towards a higher address, whilst again giving to possible elements which already have said opposite parity and having an address higher than the terminal to be displaced said first parity and this takes place by lacing a new cell and by creating a new element having the second parity with a higher address than the terminal to be displaced, unless said element already has said parity, in which case it is left as it is, the number K of units credited to the card being equal to the number of elements having the first parity located between the old terminal and the new terminal, plus 1.

2. Process according to claim 1, characterized in that the first parity is the even parity and the opposite parity is the odd parity, the terminal being constituted by the odd element with the lowest address.

3. Process according to claim 1, characterized in that the storage elements can either be pairs, or nibbles, or bytes, or more complex words, or a combination of these various elements.

4. Process according to claim 1, characterized in that the card is of the microprocessor type with a memory having a reserved zone constituted by bytes, the basic byte of address A and the following byte of address A+1 not being available for payment, the zone reserved to the payments and to reloading operations ranging from the byte of address A+2 to the last byte of address Amax.

5. Process according to claim 3, characterized in that the reserved zone comprises M words constituted in each case by N bytes, each word starting with a first byte, whose most significant nibble is determined and the same for all the words, the elements usable for the payment thus being constituted by the least significant nibble belonging to the first byte of each word and the following bytes of each word.

* * * * *

UNITED STATES PATENT AND TRADEMARK OFFICE
CERTIFICATE OF CORRECTION

PATENT NO. : 4,864,110
DATED : Sep. 5, 1989
INVENTOR(S) : Claude L. Guillou

It is certified that error appears in the above-identified patent and that said Letters Patent is hereby corrected as shown below:

Title page:

The Assignee is incorrect, "Etat Francis/Telediffusion De France" should be:

--ETAT FRANCAIS/TELEDIFFUSION DE FRANCE--

Signed and Sealed this

Second Day of October, 1990

*Attest:*

HARRY F. MANBECK, JR.

*Attesting Officer*  *Commissioner of Patents and Trademarks*